(12) United States Patent
Schukalski et al.

(10) Patent No.: US 11,872,914 B2
(45) Date of Patent: Jan. 16, 2024

(54) FITTING ARRANGEMENT HAVING SEALED BEARING BUSH

(71) Applicant: Brose Fahrzeugteile SE & Co. Kommanditgesellschaft, Coburg, Coburg (DE)

(72) Inventors: Jürgen Schukalski, Küps (DE); Jochen Hofmann, Marktgraitz (DE); Peter Hausmann, Coburg (DE)

(73) Assignee: Brose Fahrzeugteile SE & Co. Kommanditgesellschaft, Coburg, Coburg (DE)

( * ) Notice: Subject to any disclaimer, the term of this patent is extended or adjusted under 35 U.S.C. 154(b) by 143 days.

(21) Appl. No.: 17/599,049

(22) PCT Filed: Mar. 16, 2020

(86) PCT No.: PCT/EP2020/057048
§ 371 (c)(1),
(2) Date: Sep. 28, 2021

(87) PCT Pub. No.: WO2020/193245
PCT Pub. Date: Oct. 1, 2020

(65) Prior Publication Data
US 2022/0176852 A1    Jun. 9, 2022

(30) Foreign Application Priority Data

Mar. 28, 2019  (DE) ..................... 10 2019 204 339.9

(51) Int. Cl.
*B60N 2/235* (2006.01)
(52) U.S. Cl.
CPC ................. *B60N 2/2356* (2013.01)

(58) Field of Classification Search
CPC .................................................. B60N 2/2356
See application file for complete search history.

(56) References Cited

U.S. PATENT DOCUMENTS 6,332,649 B1   12/2001   Vossmann
6,824,216 B2   11/2004   Uramichi
(Continued)

FOREIGN PATENT DOCUMENTS

CN        102548795 A       7/2012
CN        104114408 A      10/2014
(Continued)

OTHER PUBLICATIONS

Chinese Office Action for CN Application No. 202080019899.5, English Translation attached to original, dated Feb. 11, 2023, All together 26 Pages.

*Primary Examiner* — Timothy J Brindley
(74) *Attorney, Agent, or Firm* — Dickinson Wright PLLC

(57) ABSTRACT

A fitting arrangement for a vehicle seat including two fitting parts adjustable relative to each other about an adjustment axis and forming a bearing space, a locking element disposed in the bearing space on one of the two fitting parts and radially adjustable with respect to the adjustment axis between an unlocking position, in which the two fitting parts are pivotable relative to each other and a locking position, in which the two fittings parts are non-rotatably locked to each other, and at least one adjuster part pivotally mounted within the bearing space for adjusting the locking element between the unlocking position and the locking position. The at least one adjuster part mounted on a bush element on which a cover element is provided for sealing the bearing space and attached axially with.

20 Claims, 6 Drawing Sheets

(56) References Cited

U.S. PATENT DOCUMENTS

| | | | |
|---|---|---|---|
| 8,998,329 B2* | 4/2015 | Becker | B60N 2/2356 297/367 L |
| 2009/0072602 A1 | 3/2009 | Schuler | |
| 2014/0368016 A1 | 12/2014 | Peters et al. | |
| 2023/0082477 A1* | 3/2023 | Kim | B60N 2/2356 297/362 |

FOREIGN PATENT DOCUMENTS

| | | | | |
|---|---|---|---|---|
| CN | 110395151 A | * | 11/2019 | ............... B60N 2/20 |
| DE | 4441159 A1 | | 5/1995 | |
| DE | 19904300 C1 | | 8/2000 | |
| DE | 102004035599 B3 | | 1/2006 | |
| DE | 102008024052 A1 | | 11/2009 | |
| DE | 102008024853 A1 | | 11/2009 | |
| DE | 102008028101 A1 | | 12/2009 | |
| DE | 102009022777 A1 | | 11/2010 | |
| DE | 102011012428 A1 | | 8/2012 | |
| DE | 102014215116 A1 | | 2/2015 | |
| FR | 3041293 A1 | | 3/2017 | |
| KR | 20150096931 A | * | 8/2015 | |
| WO | 2011029521 A2 | | 3/2011 | |

* cited by examiner

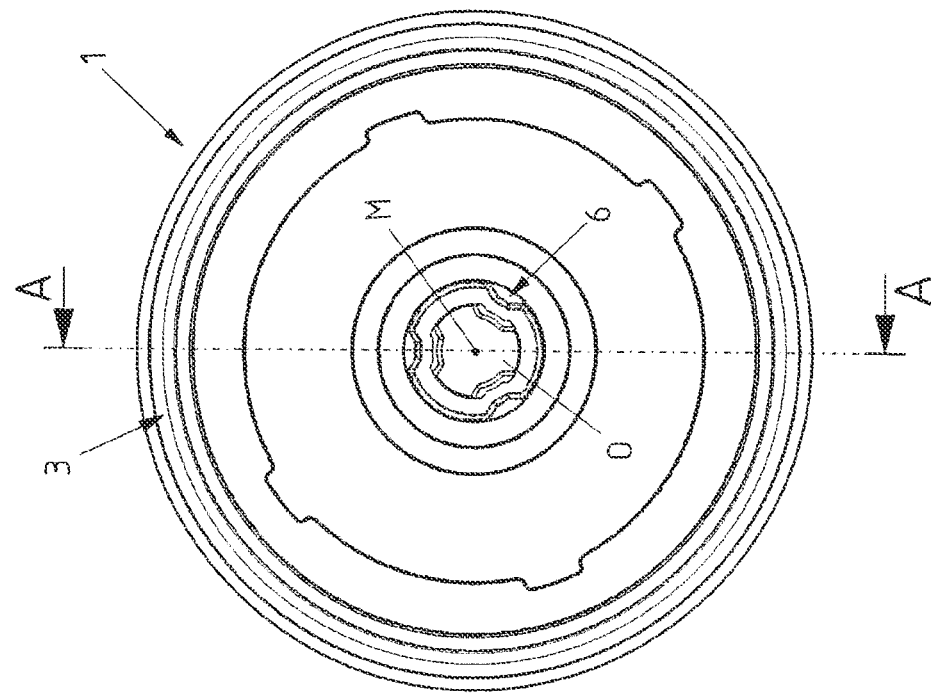
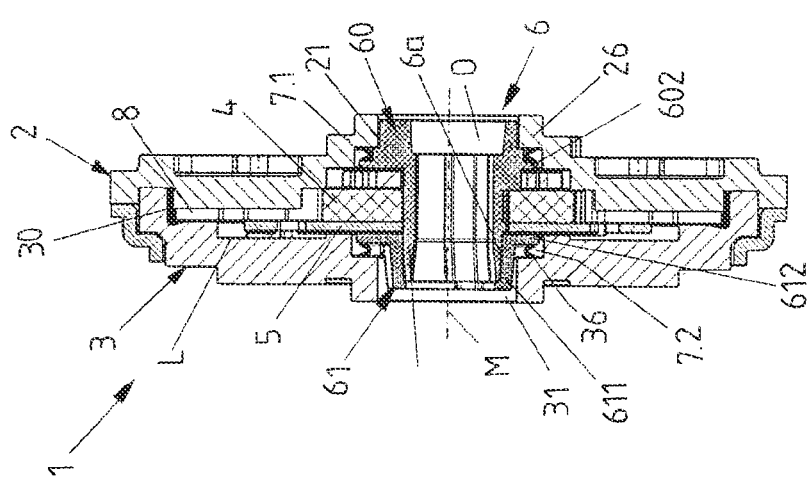

(B-B)

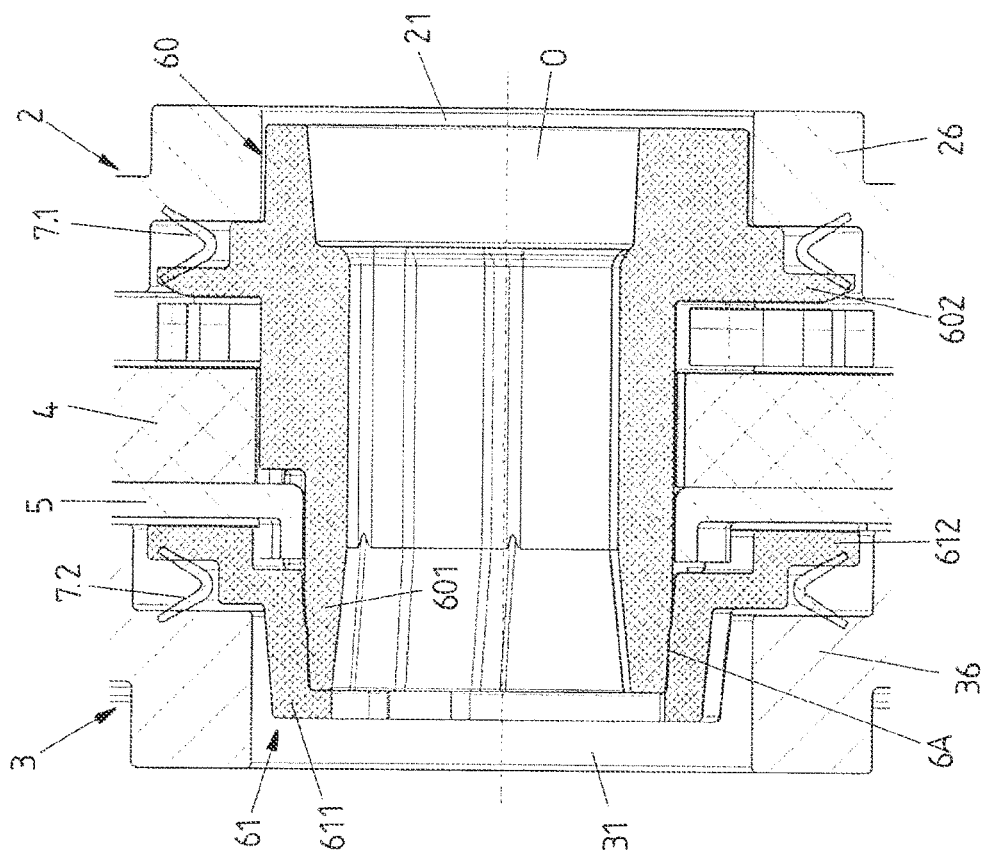
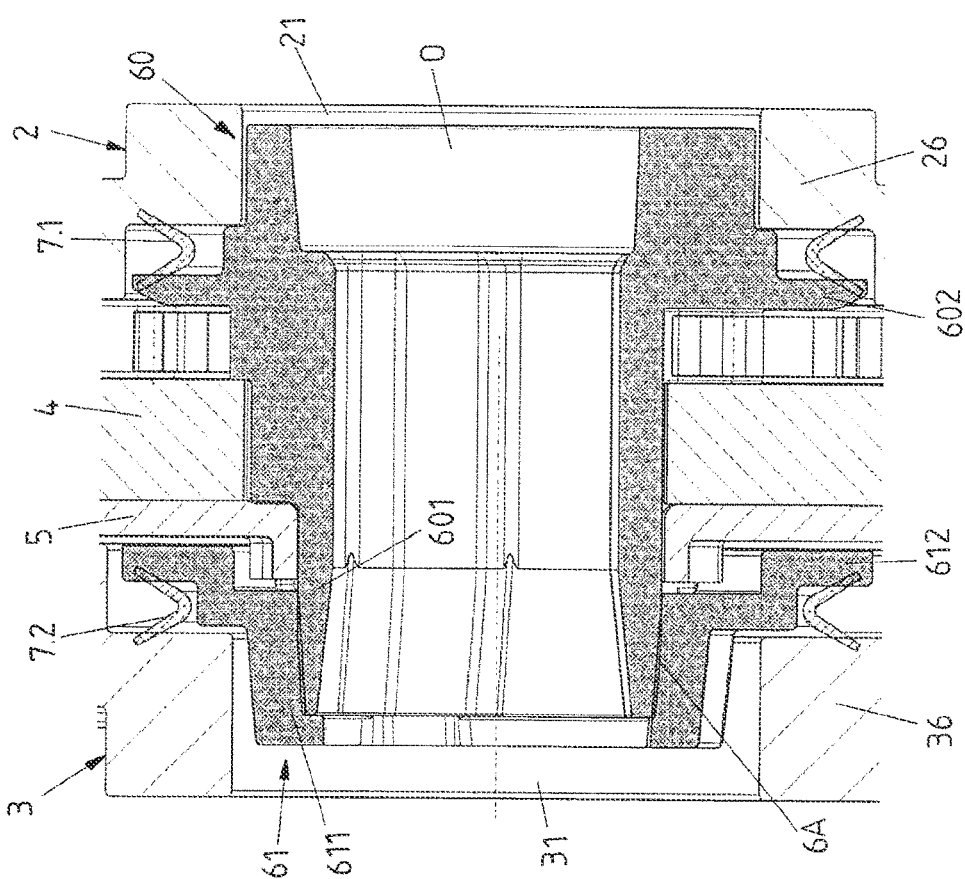

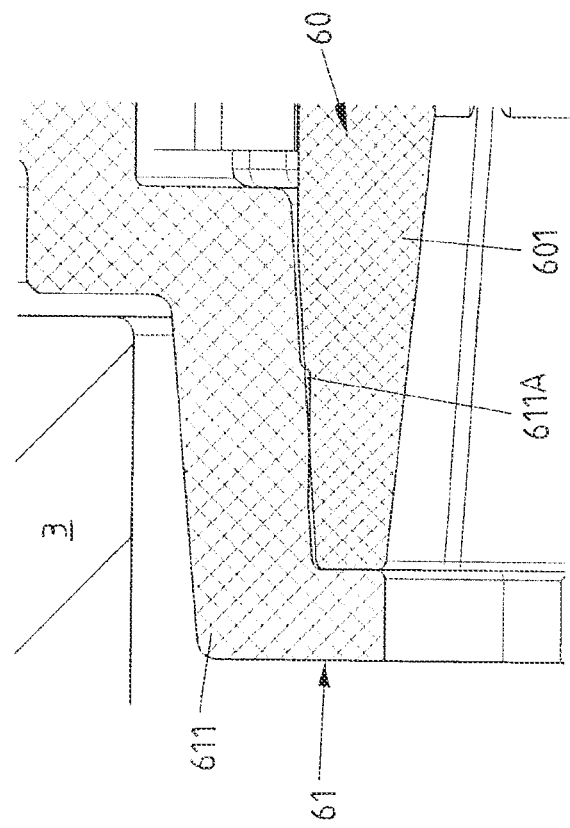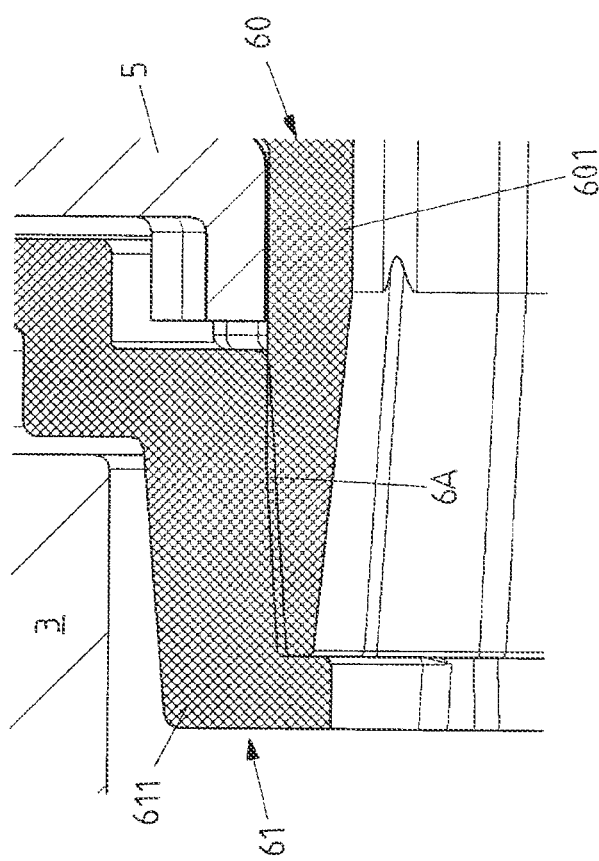

FITTING ARRANGEMENT HAVING SEALED BEARING BUSH

CROSS-REFERENCE TO RELATED APPLICATIONS

This application is the U.S. National Phase of PCT Application No. PCT/EP2020/057048 filed on Mar. 16, 2020, which claims priority to German Patent Application No. DE 10 2019 204 339.9, filed on Mar. 28, 2019, the disclosures of which are hereby incorporated in their entirety by reference herein.

TECHNICAL FIELD

The present disclosure relates to a fitting arrangement for a vehicle seat and to an assembly method for a fitting arrangement.

BACKGROUND

Fitting arrangements for vehicle seats are widely known in practice in different design variants, for example as rotary fittings or detent fittings. Fitting arrangements may be actuated between locked position, in which the backrest is not moveable, and an unlocked position, in which the backrest is movable.

In fitting arrangements previously used in practice the difficulty frequently arises that the same cannot be painted easily. For example, dip painting is regularly made more difficult because any paint that penetrates into the bearing space of the fitting arrangement, in which the adjustable components are mounted, can lead to sticking and impair the functionality of the fitting arrangement. The ingress of paint also is particularly problematic when a relative movement between adjuster parts, such as a cam disk and a link disk, is required in order to ensure the function of the fitting arrangement. It is known to provide axially acting seals at corresponding points. However, assembly regularly is made more difficult thereby and dip painting yet is not easily possibly.

SUMMARY

Against this background one or more objects of the present disclosure may be to provide a fitting arrangement which is improved in this respect.

According to one or more embodiments, a fitting arrangement is provided. The fitting arrangement may include at least one adjuster part arranged within the bearing space of the fitting arrangement is mounted on a bush element of the fitting arrangement for actuating the at least one locking element, and on this bush element a cover element provided for sealing the bearing space is attached axially with respect to an adjustment axis about which the adjuster part is adjustable.

Via a corresponding bush assembly that may include a bush element and a cover element sealingly attached thereto, the assembly of the fitting arrangement can be made comparatively easy and may be configured to prevent disturbing liquid, such as liquid paint, enters in the region of the adjuster part to be adjustably mounted. Thus, one adjuster part or several (at least two) adjuster parts can be arranged on the bush element, and by means of the attached cover element sealing of the bearing space and of the at least one adjuster part can be achieved in order to protect the bearing space within the fitting arrangement and the at least one adjuster part against penetrating liquid.

Correspondingly, one design variant for example provides that via an outer contour of a portion of the bush element, to which the cover element is attached, and an inner contour of a portion of the cover element, with which the cover element is attached to the bush element, a sealing surface is formed, via which an ingress of liquid, such as liquid paint, along the bush element towards the adjuster part is prevented. On a contact surface between the attached cover element and the bush element bearing the adjuster part or the adjuster parts, there is thus formed a sealing surface beyond which no liquid can get. This may include the fact that in dip painting the fitting arrangement designed in this way is protected against an ingress of paint into the interior of the fitting arrangement and, for example, up to the at least one adjuster part. Thus, sticking of an adjuster part to other components within the bearing space due to penetrated paint may be reliably prevented.

For example, the inner contour of a through opening of the portion of the cover element attached to the bush element may taper radially, such as taper conically, relative to the adjustment axis on at least one area. In this way, a sealing press fit between the bush element and the cover element is supported. Due to the corresponding geometry of the bush element and the cover element, a comparatively small and possibly also manually applied mounting force for example may already be sufficient in order to ensure a sealing connection between the bush element and the cover element. A radial taper in particular includes the fact that a portion of the cover element provided with a through opening, via which the cover element is attached to the bush element, has an inner wall with an inner contour which on at least one point forms a smaller cross-section than an outer contour of a portion of the bush element to which the cover element is attached.

In one or more embodiments, the cover element rests against the at least one adjuster part in order to remove an axial clearance. Here, the cover element consequently is urged against an adjoining adjuster part in order to exclude an axial clearance of the adjuster part. Thus, during assembly, the cover element then, for example, is axially urged against the adjuster part arranged already on the bush element so that between the adjuster part and the cover element no clearance is present in an axial direction (with respect to the adjustment axis).

In or more embodiments, the cover element is arranged at a (defined) distance to the adjuster part, which adjoins the cover element in an axial direction. In this variant, a defined distance thus is left between the cover element and an adjoining adjuster part in order to ensure and specifically set a certain axial clearance. Thus, for example a defined axial clearance may be present between the cover element and an adjoining adjuster part. For example, in the properly mounted state a gap is present between the cover element and an adjoining adjuster part in order to specifically set a bearing clearance between the cover element and an adjuster part and/or between two adjuster parts within the bearing space. While in the variant explained above the cover element hence is used to remove an axial clearance, in order to especially exclude a bearing clearance, a corresponding bearing clearance is specifically set and permitted in the variant in which the cover element is arranged at a distance to an adjoining adjuster part in an axial direction.

In one or more embodiments, at least one sealing element is arranged on the bush element and/or the cover element. Such an additional sealing element for example serves to provide a seal with respect to an associated fitting part of the fitting arrangement. Then, for example at least one sealing element rests against a bearing portion of the bush element or the cover element on the one hand and against a bearing surface of an associated fitting part on the other hand. A bearing portion of the bush element or of the cover element here for example may be collar-shaped, web-shaped or ring-shaped and, for example, may be configured in the form of a shoulder extending around the adjustment axis. On such a bearing portion a corresponding, e.g. elastic, sealing element then is supported in a first axial direction along the adjustment axis, whereas in an opposite axial direction it is supported on the bearing surface of the associated fitting part and hence prevents the ingress of moisture, in particular paint, via a possibly existing gap between a fitting part and the bush assembly which is formed with the bush element and the cover element into the bearing space.

In another embodiment, there may be provided at least one first sealing element which rests against a bearing portion of the bush element and against the (e.g. opposite) bearing surface of a first fitting part of the two fitting parts, whereas at least one second sealing element rests against the bearing portion of the cover element and against the bearing surface of the second fitting part. Via the first sealing element, a seal thus is provided at the bush element relative to the first fitting part. Via the second sealing element, on the other hand, a seal of the cover element is provided relative to the second fitting part.

As an example, the bearing surface of the first or second fitting part, on which a sealing element is supported, (each) faces the bearing space. The bearing surface then is formed on an inside of the respective fitting part facing the bearing space. Via the sealing connection between the bush element and the cover element on the one hand and via the sealing elements between the bush element and the first fitting part as well as between the cover element and the other, second fitting part on the other hand, the bearing space may be sealed completely towards the outside without an assembly effort for the assembly of the fitting arrangement being significantly increased thereby.

A sealing element in principle may be formed as a separately manufactured component. Alternatively, a sealing element may be formed on or integrally molded to a bush element, cover element or fitting part, for example by designing the respective component as a multi-part component or by manufacturing the same by a multi-component injection molding method or a multi-component 3D printing method. A sealing element for example may include a sealing ring. The sealing ring may be configured for example to extend around the adjustment axis and during the assembly correspondingly may be arranged as a separately manufactured component or may be formed on a corresponding component or may be integrally molded to a corresponding component.

In one design variant, the cover element does not protrude from the fitting arrangement in an axial direction. The cover element then for example is received completely within a through opening on an associated fitting part. Alternatively or additionally, the bush element may be received completely within a through opening on an associated (other) fitting part of the fitting arrangement so that the bush element does not protrude from the fitting arrangement in an axial direction. The respective fitting part receiving one of the elements of the bush assembly thus forms the front side of the fitting arrangement in an axial direction and hence defines the maximum axial extension of the fitting arrangement.

For coupling the fitting arrangement with an actuating element, e.g. in the form of an actuating shaft, the fitting arrangement in one design variant includes a bush element which defines a shaft opening for the positive connection with the actuating element. In a state properly mounted on a vehicle seat, an actuating element then for example positively engages into the shaft opening of the fitting arrangement defined by the bush element in order to unlock the fitting arrangement by rotation when necessary. By rotation of the actuating element, the at least one adjuster part is pivotable in the bearing space of the fitting arrangement, wherein the corresponding pivoting movement leads to an action on the at least one locking element of the fitting arrangement in order to permit a displacement of the two fitting parts relative to each other. As in the state properly mounted on a vehicle seat the fitting parts are associated with different assemblies of the vehicle seat, which are adjustable relative to each other, and are fixed thereto, for example to a backrest on the one hand and to a seat substructure on the other hand, a displacement of these assembly relative to each other than is thereby permitted.

For the positive connection with an actuating element, the bush element may have an outer contour with at least two radially protruding form-fit areas in its cross-section. The provision of such radially protruding form-fit areas for example supports a process-safe connection of the actuating element to the fitting arrangement so that the actuating element may be introduced into the shaft opening only in a particular orientation with respect to the corresponding shaft opening.

In principle, the fitting arrangement may form a premounted construction unit with the two fitting parts, the at least one locking element, the at least one adjuster part, and a bush assembly that may include the bush element and the cover element. Such a premounted construction unit then is provided for assembly to a vehicle seat or to two seat components or assemblies of the vehicle seat to be interlocked with each other and to be adjustable relative to each other when necessary. The fitting arrangement thus may form a premounted construction unit pretestable for its proper function, which is to be mounted to a backrest and a seat substructure of the vehicle seat in order to interlock the backrest with the seat substructure when the at least one locking element is in its locking position, and to permit an adjustment of the inclination of the backrest relative to the seat substructure when the at least one locking element is in its unlocking position.

Another aspect of the proposed solution relates to a method for the assembly of a fitting arrangement for of vehicle seat.

The proposed method here provides at least the following steps:

providing a first fitting part, a second fitting part, at least one locking element, at least one adjuster part and a bush assembly that may include a bush element and a cover element, arranging the bush element in a through opening of the first fitting part, arranging the at least one locking element on the first fitting part and the at least one adjuster part on the bush element in such a way that by means of a rotation of the at least one adjuster part about an adjustment axis defined by the bush element the at least one locking element is radially adjustable between an unlocking position and a locking position, attaching the cover element to the bush element along the adjustment axis, and arranging the second fitting part on the first fitting part by forming a bearing space between the first fitting part and the second fitting part, in which the at least one locking element and the at least one adjuster part are received.

The at least two-part bush assembly for mounting the at least one adjuster part provides for a comparatively simple assembly process and, for example, with a cover element pressed onto the bush element, ensures a seal so that a corresponding fitting arrangement subsequently may also be painted by dip painting, without having to fear that components of the fitting arrangement adjustably mounted within the bearing space will stick together due to paint penetrating into the bearing space.

As an example, for pressing the cover element onto the bush element it may be provided that the cover element is made of a material which is less stiff than the material of which the bush element is made. Correspondingly, the cover element may be deformed specifically when pressed on and may be flattened, for example, in the area of a contact point between the cover element and the bush element, in order to form a sealing surface. The formation of the sealing surface and hence of a full-surface contact between cover element and bush element, however, does not depend on a deformability of the cover element.

A portion of the cover element, via which the cover element is attached to the bush element, may be received in a through opening of the second fitting part when the second fitting part is arranged on the first fitting part.

The cover element may be pressed on for example by elastic deformation both of the cover element and of the bush element. Alternatively, the cover element may be pressed on by plastic deformation of at least one portion formed on the cover element or on the bush element. For example, the portion to be plastically deformed may be formed as a squeeze contour or scraper rib on the cover element or the bush element, such as a squeeze contour or scraper rib extending circumferentially or circumferentially completely around the adjustment axis.

As regards the above-mentioned possibility of pressing the cover element onto a portion of the bush element it may be provided in one variant that the cover element is pressed on up to a stop defined on the bush element. The bush element thus limits the extent to which the cover element may be displaced on the bush element until it reaches an intended connect position. For example, it may be achieved thereby that between the cover element and an adjuster part mounted on the bush element a defined minimum distance always remains in an axial direction. In this way, a desired bearing clearance may be set.

Alternatively, the cover element on the bush element may be pressed against an adjuster part in order to avoid an axial clearance. In this variant, pressing on of the cover element thus leads to the removal of clearance within the fitting arrangement.

Between the first fitting part and the bush element at least one (first) sealing element may be arranged in order to achieve an (additional) sealing between the fitting part and the bush element. Alternatively or additionally, at least one (second) sealing element may be arranged between the cover element and the second fitting part.

A proposed assembly method here may be provided, for example, for the assembly of a proposed fitting arrangement. Correspondingly, the advantages and features of design variants of a proposed fitting arrangement as explained above and below also apply for design variants of a proposed assembly method, and vice versa.

As an example, a proposed fitting arrangement may be configured as a detent fitting. As an example, against this background, an adjuster part for example may be a cam disk or a link disk. Via a cam disk, the at least one locking element of the fitting arrangement, for example in the form of a locking bolt, may be urged radially outwards with respect to the adjustment axis into the locking position in which the locking element is locked in place with a (second) fitting part by engagement into a counter-toothing formed on the fitting part. Via a link disk (as an additional adjuster part) it may in turn be possible to control an adjusting movement of the at least one locking element with respect to the adjustment axis radially inwards into the unlocking position, in order to release the two fitting parts relative to each other and permit their pivotability relative to each other about the adjustment axis.

The attached Figures by way of example illustrate possible design variants of the proposed solution.

BRIEF DESCRIPTION OF THE DRAWINGS

In the drawings:

FIG. 1 shows a side view of a design variant of a proposed fitting arrangement;

FIG. 1A shows the fitting arrangement of FIG. 1 in a sectional view according to the sectional line A-A of FIG. 1;

FIG. 4A shows a sectional view of the fitting arrangement that may include a bearing bush and a bush cover pressed onto the same by elastic deformation;

FIG. 4B shows a sectional view of the fitting arrangement that may include a bearing bush and a bush cover pressed onto the same by elastic deformation;

FIG. 5A on an enlarged scale and in a sectional view shows segments of a connecting area between the bearing bush and the bush cover of FIG. 4A, which is pressed onto the same by elastic deformation;

FIG. 5B on an enlarged scale and in a sectional view shows segments of a connecting area between the bearing bush and the bush cover of FIG. 4B, which is pressed onto the same by plastic deformation;

DETAILED DESCRIPTION

Figure 2B:
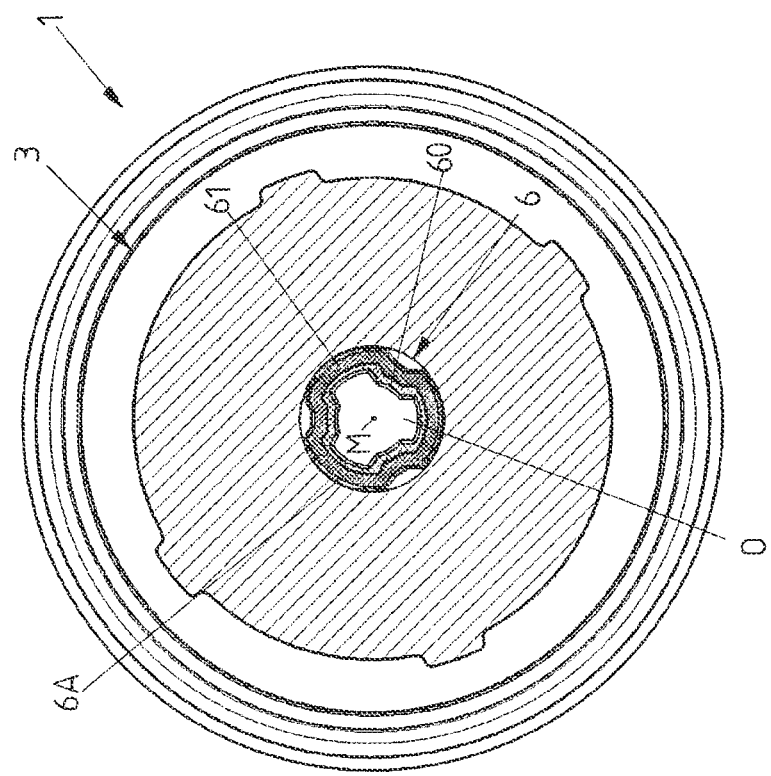
FIG. 2B shows the fitting arrangement of FIG. 2 along the sectional line B-B of FIG. 2.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A known fitting arrangement is provided in DE 10 2009 022 777 A1 which discloses a fitting arrangement in the form of a detent fitting, in which a bearing space is defined between two fitting parts, in which in particular a plurality of locking elements in the form of locking bolts are arranged. These locking bolts are radially adjustable with respect to an adjustment axis between an unlocking position and a locking position. In the locking position, the locking bolts radially shiftably guided on the one fitting part engage into a toothing of the other fitting part in order to non-rotatably connect the two fitting parts to each other. In the locking position, a backrest of a vehicle seat, for example, is fixed in its position assumed relative to a seat base via the detent fitting. When the locking bolts are displaced radially inwards into an unlocking position, the two fitting parts are pivotable relative to each other. Then, a backrest is adjustable for example in its inclination relative to the seat base.

To change between the unlocking position and the locking position of the locking elements in the form of the locking bolts, at least one adjuster part is provided. In a detent fitting corresponding to DE 10 2009 022 777 A1, for example, there is provided an adjustment of the locking bolts into a locking position by means of an adjuster part in the form of a cam disk, in order to bring a toothing of the locking bolt into engagement with an internal toothing of a fitting part. Moreover, an additional adjuster part can be provided in order to transfer the locking bolts from a locking position into the unlocking position. Such a second adjuster part is formed for example by a control or link disk. Guide pins or guide webs of the locking bolts engage into slotted guides of such a link disk, so that on rotation of the link disk the locking bolts are displaced radially inwards when such an adjustment no longer is counteracted via the cam disk.

DE 10 2008 024 052 A1 already describes an approach with elastic sealing elements sealing axial gaps on a fitting arrangement. Here, it is at least accepted that in dip painting paint will get to the cam disk and to a through opening of the cam disk, in which an actuating shaft will be received.

Figure 2:
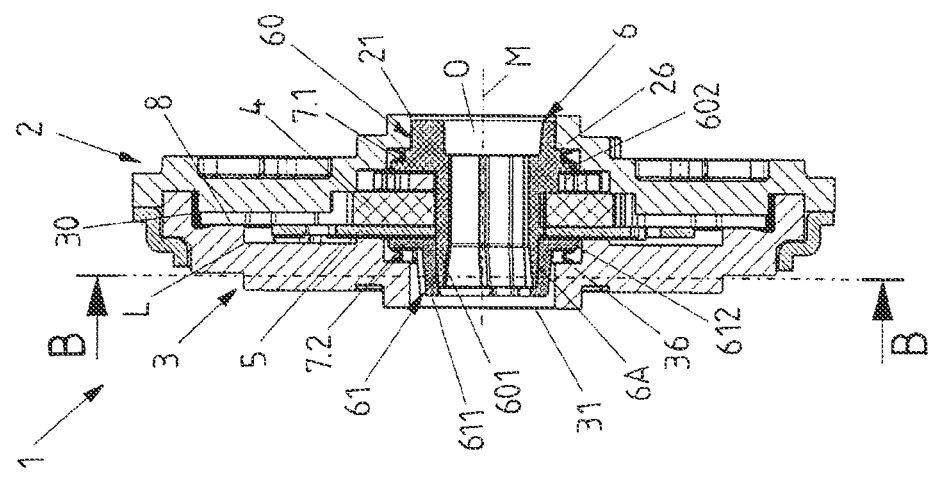
FIG. 2 shows the fitting arrangement in a view corresponding with FIG. 1A.
Figure 3:
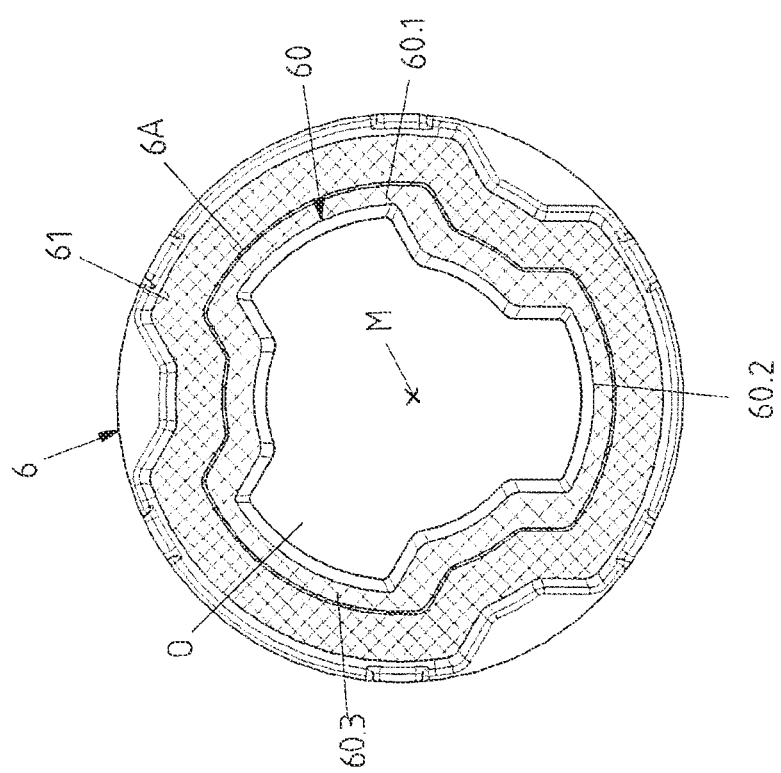
FIG. 3 shows an enlarged segment of the sectional representation of FIG. 2B with a view to a bush assembly.

FIGS. 1 to 3 show different views of a design variant of a proposed fitting arrangement in the form of a detent fitting 1. This detent fitting 1 is provided for a vehicle seat in order to be able to lock a backrest on the vehicle seat relative to a seat substructure of the vehicle seat and to hold it in a locked or latched state, respectively. On actuation of the detent fitting unlocking is possible in order to permit a tilt adjustment of the backrest with respect to the seat substructure. Typically, two detent fittings are provided on mutually opposite longitudinal sides of the vehicle seat so that with respect to a pivot axis of the backrest the detent fittings are arranged on the vehicle seat in a manner axially offset from each other. To achieve a synchronous actuation of both detent fittings, the same for example are mechanically coupled with each other via an actuating shaft.

The detent fitting 1 of FIGS. 1 to 3 includes two interconnected fitting parts in the form of a guide plate 2 and a tooth plate 3. One of the fitting parts 2, 3 is fixed to the backrest or the seat substructure, and the other fitting part 3, 2 is fixed to the other component or assembly of the vehicle seat, so that via a relative displacement of the two fitting parts 2, 3 an adjustment of the respective components of the vehicle seat relative to each other is permitted.

On the guide plate 2, locking elements 8 for example in the form of locking bolts are adjustably guided radially with respect to an adjustment axis M about which the two fitting parts 2, 3 are pivotable relative to each other. Via a first adjuster part in the form of a cam disk 4, these locking elements 8, which are provided on the guide plate 2 in a manner distributed around the adjustment axis M, are urged into engagement with an internal toothing 30 of the tooth plate 3. Locking teeth formed on a locking element 8 then are in engagement with the internal toothing 30 of the tooth plate 3 and hence non-rotatably lock the guide plate 3 and the tooth plate 3 to each other.

Via a further, second adjuster part in the form of a control disk configured as a link disk 5, the locking elements 8 may be displaced radially inwards in order to bring the locking elements 8 out of engagement with the internal toothing 30 of the tooth plate 3. In an unlocking position of the locking elements 8, which is assumed in this way, the two fitting parts 2 and 3 may be pivoted relative to each other about the adjustment axis M.

In the illustrated design variant, both the cam disk 4 and the link disk 5 are mounted on a two-part bush assembly 6. This bush assembly 6 includes a bush element in the form of a bearing bush 60 on which the cam disk 4 and the link disk 5 are provided. Via a cover element in the form of a bush cover 61 of the bush assembly 6 a seal is produced in order to prevent that liquid and in particular paint originating from dip painting may flow along the bearing bush 60 to the cam disk 4 and the link disk 5. The cam disk 4 and the link disk 5 here are provided together with the locking elements 8 within a bearing space L that is formed between the two fitting parts 2 and 3. If paint would get into this bearing space L during dip painting, after the detent fitting 1 has been premounted, this might lead to undesired sticking of the cam disk 4 to the link disk 5. This is excluded by means of the two-part bush assembly 6, without having to dispense with a particularly easy mountability of the detent fitting 1.

The bearing bush 60, which for example is manufactured from plastic, initially is inserted into a central through opening 21 of the guide plate 2. Between a shoulder of the bearing bush 60 radially protruding like a collar, which serves as a bush-side bearing portion 602, and a bearing surface 26 of the guide plate 2, which faces the bearing space L and extends around the through opening 21, a first sealing element in the form of a sealing ring 7.1 is received. When the cam disk 4 and the link disk 5 have been provided on the bearing bush 60 and the locking elements 8 have been properly mounted on the guide plate 2, the bush cover 61 is pressed onto a longitudinally extended sleeve portion 601 of the bearing bush 60. The bush cover 61 therefor includes a fixing portion 611 with a through opening whose inside diameter and inner contour are adjusted to the outside diameter and the outer contour of the sleeve portion 601 of the bearing bush 60. The bush cover 61 is pushed towards the link disk 5 in an axial direction, until the desired compression between bearing bush 60 and bush cover 61 is achieved via a locally reduced inside diameter of the fixing portion 611 of the bush cover 61. It may be provided, for example, that pressing on is effected up to a defined stop at the bearing bush 60, so that a specific axial clearance is obtained for the cam disk 4 and the link disk 5. Alternatively, pressing on is effected completely up to the link disk 5 so that no axial clearance is present between link disk 5 and cam disk 4.

Possibly, the material of the bearing bush 60 is stiffer than the material of the bush cover 61 so that when pressed on, the bush cover 61 initially is connected to the sleeve portion 601 of the bearing bush 60 only at certain points and then is specifically flattened when pressed on. In any case, a sealing surface 6A is produced between the bearing bush 60 and the bush cover 61 via the attached bush cover 61, beyond which sealing surface no liquid may flow along the bearing bush 60 into the bearing space L and to the adjuster parts 4, 5.

For additionally sealing the bush cover 61 against the tooth plate 3, there is provided another sealing element in the form of a sealing ring 7.2. This sealing ring 7.2 is arranged on a bearing portion 612 of the bush cover 61 radially protruding like a collar and, with attached tooth plate 3, is supported on the cover-side bearing portion 612 and opposite the bearing portion 612 on a bearing surface 36 of the tooth plate 3 extending around the adjustment axis M. The bearing surface 36 likewise faces the bearing space L of the detent fitting 1 and extends around a through opening 31 of the tooth plate 3, in which the fixing portion 611 of the bush cover 61 is received completely. In this way, the bush cover 61 does not axially protrude from the detent fitting 1. The same applies for the bearing bush 60 on the guide blade 2.

Corresponding to the representations of FIGS. 2B and 3, the bearing bush 60 defines an inner contour for a shaft opening O of the detent fitting 1 with a plurality of form-fit areas 60.1, 60.2 and 60.3. An actuating shaft may positively engage into this shaft opening O in order to rotate the bush assembly 6 about the adjustment axis M and thereby act on the link disk 5 and the cam disk 4 and adjust the locking elements 8 between their unlocking position and their locking position. The bush assembly 6 that may include the bearing bush 60 and the bush cover 61 thus provides the interface for an actuating element for actuating the detent fitting 1.

Although this is not shown in the Figures, the detent fitting 1 may include at least one spring element or several spring elements within the bearing space L, via which the locking elements 8 are pretensioned into their respective locking position and/or via which the cam disk 4 or the link disk 5 is pretensioned about the adjustment axis M.

To facilitate pressing on of the bush cover 61, the bearing bush 60 may have a chamfer of possibly only few degrees at its axial end located in the direction of the tooth plate 3. Alternatively or additionally, the inner contour of the bush cover 61 may correspond with the outer contour of the sleeve portion 601 of the bearing bush 60, but can have a smaller cross-section at least one point in order to provide for a press fit and to prevent that during dip painting of the detent fitting 1 paint may flow via the bush assembly 6 into the bearing space L and in particular to the link disk 5 and the cam disk 4.

FIGS. 4A and 5A show a design variant in which the bush cover 61 is pressed on via an interference fit and by elastic deformation of the fixing portion 611 of the bush cover 61 and of the sleeve portion 601 of the bearing bush 60. The press fit here is provided circumferentially around the adjustment axis M so that the bush cover 61 circumferentially along the sealing surface 6A flatly rests against the outer shell surface of the sleeve portion 601.

FIGS. 4B, 5B, 6 and 7 furthermore show a design variant in which the bush cover 61 may be pressed onto the sleeve portion 601 of the bearing bush 60 by plastic deformation. On its fixing portion 611, the bush cover 61 internally and circumferentially along the circumference forms a squeeze contour 611A. This annular circumferential squeeze contour 611A or an annular circumferential scraper rib is plastically deformed when the bush cover 61 is pressed onto the sleeve portion 601 of the bearing bush 60 so that the press fit between bearing bush 60 and bush cover 61 is ensured and the sealing surface 6A is formed.

Figure 6:
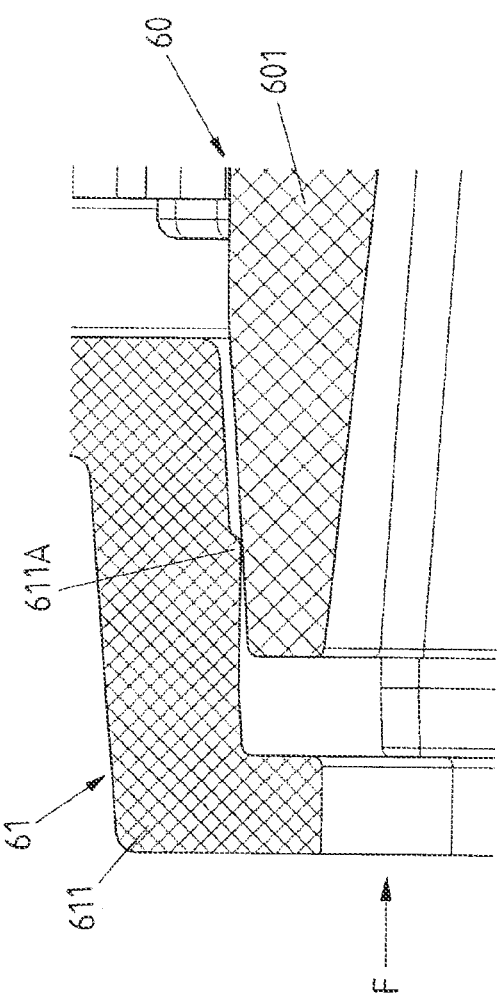
FIG. 6 shows the bush cover of the fitting arrangement of FIGS. 4A and 5A with a squeeze contour formed thereon and extending around its circumference, during the assembly.
Figure 7:
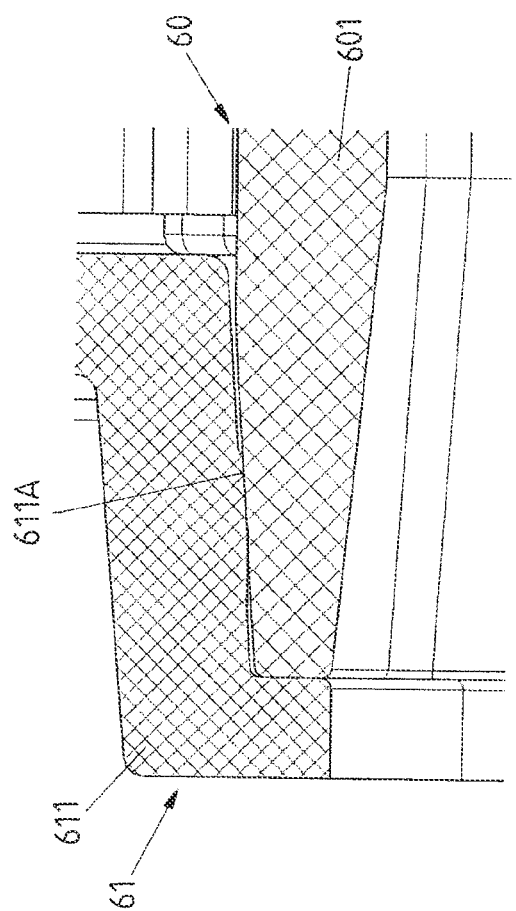
FIG. 7 shows the bush cover of the fitting arrangement of FIGS. 4A and 5A in the assembled state.

The sectional representations of FIGS. 6 and 7 shown on an enlarged scale illustrate the pressing of the bush cover 61 onto the bearing bush 60 along the adjustment axis M. Due to a longitudinally applied mounting force F, the radially inwardly protruding squeeze contour 611A of the bush cover 61 is plastically deformed in contact with the sleeve portion 601 of the bearing bush 60 so that in the vicinity of the squeeze contour 611A the bush cover 61 flatly (by forming the sealing surface 6A) rests against the outer shell surface of the sleeve portion 601 with a force fit.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS 1 detent fitting (fitting arrangement)
2 guide plate (fitting part)
21 through opening
26 bearing surface
3 tooth plate (fitting part)
30 internal toothing
31 through opening
36 bearing surface
4 cam disk (adjuster part)
5 link disk (adjuster part)
6 bush assembly
60 bearing bush (bush element)
60.1, 60.2, 60.3 form-fit area
601 sleeve portion
602 bearing portion
61 bush cover (cover element)
611 fixing portion
611A squeeze contour
612 bearing portion
6A sealing surface
7.1, 7.2 sealing ring
8 locking element
L bearing space
M adjustment axis
O shaft opening While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The invention claimed is:

1. A fitting arrangement for use in a vehicle seat, the fitting arrangement comprising:
    two fitting parts defining a bearing space and configured to be adjusted relative to each other about an adjustment axis;
    at least one locking element disposed within the bearing space and on one of the two fitting parts, wherein the at least one locking element is radially adjustable with respect to the adjustment axis between an unlocking position and a locking position, wherein when the at least one locking element is in the unlocking position, the two fitting parts are pivotable relative to each other, and when the at least one locking element is in the locking position, the two fitting parts are non-rotatably locked to each other;
    a bush element disposed in the bearing space;
    at least one adjuster part pivotally mounted to the bush element and configured to adjust the at least one locking element between the unlocking position and the locking position;
    a cover element disposed on the bush element and configured to seal the bearing space, wherein the cover element is axially fixed with respect to the adjustment axis and rests against the at least one adjuster part; and
    at least one sealing element disposed on the bush element and/or the cover element, wherein the at least one sealing element rests against a bearing portion of the bush element and against a bearing surface of a fitting part of the two fitting parts.

2. The fitting arrangement of claim 1, wherein a portion of the bush element includes an outer contour and a portion of the cover element includes an inner contour, wherein the inner contour of the cover element is attached to the outer contour of the bush element to form a sealing surface configured to prevent an ingress of liquid from moving along the bush element towards the at least one adjuster part.

3. The fitting arrangement of claim 2, wherein at least one area of the inner contour of the portion of the cover element is tapered radially with respect to the adjustment axis.

4. The fitting arrangement of claim 1, wherein the cover element is pressed onto a portion of the bush element.

5. The fitting arrangement of claim 1, wherein a portion of the cover element is spaced apart from the at least one adjuster part in an axial direction.

6. The fitting arrangement of claim 1, wherein the at least one sealing element rests against a bearing portion of the cover element and against a bearing surface of a fitting part.

7. The fitting arrangement of claim 6, wherein the at least one sealing element includes,
    a first sealing element of the at least one sealing element, wherein the first sealing element rests against the bearing portion of the bush element and against the bearing surface of a first fitting part of the two fitting parts; and
    a second sealing element of the at least one sealing element, wherein the second sealing element rests against the bearing portion of the cover element and against the bearing surface of a second fitting part.

8. The fitting arrangement of claim 1, wherein the bearing surface faces the bearing space.

9. The fitting arrangement of claim 1, wherein the at least one sealing element includes a sealing ring.

10. The fitting arrangement of claim 1, wherein the bush element defines a shaft opening configured to form a positive connection between an actuating element and the fitting arrangement.

11. The fitting arrangement of claim 1, wherein in cross-section the bush element includes an outer contour provided with at least two radially protruding form-fit areas.

12. The fitting arrangement of claim 1, wherein the fitting arrangement includes a bush assembly provided with the bush element and the cover element, and wherein the two fitting parts, the at least one locking element, the at least one adjuster part, forms a premounted construction unit.

13. A method for assembly of a fitting arrangement for use in a vehicle seat, the method comprising:
    providing a first fitting part, a second fitting part, at least one locking element, at least one adjuster part, and a bush assembly including a bush element and a cover element;
    arranging the bush element in a through opening of the first fitting part;
    arranging the at least one locking element on the first fitting part and the at least one adjuster part on the bush element such that via a rotation of the at least one adjuster part about an adjustment axis, defined by the bush element, the at least one locking element is radially adjustable between an unlocking position and a locking position;
    attaching the cover element to the bush element along the adjustment axis so that the cover element presses onto a portion of the bush element and against the at least one adjuster part to axially fix the at least one adjuster part and elastically deform the cover element and the bush element; and
    arranging the second fitting part on the first fitting part to form a bearing space between the first fitting part and the second fitting part, wherein the bearing space receives the at least one locking element and the at least one adjuster part.

14. The method of claim 13, wherein the arranging the second fitting part step includes inserting a portion of the cover element that is attached to the bush element, into a through opening of the second fitting part.

15. The method of claim 13, wherein the pressing the cover element step includes plastically deforming at least one squeeze contour or a scraper rib formed on the cover element or the bush element.

16. The method of claim 13, wherein the pressing the cover element step includes pressing the cover element until the cover element is pressed against a stop formed by the bush element.

17. The method of claim 13, further comprising:
    arranging a first sealing element between the first fitting part and the bush element and/or arranging a second sealing element between the cover element and the second fitting part.

18. A fitting arrangement for use in a vehicle seat, the fitting arrangement comprising:
    two fitting parts defining a bearing space and configured to be adjusted relative to each other about an adjustment axis;
    at least one locking element disposed within the bearing space and on one of the two fitting parts, wherein the at least one locking element is radially adjustable with respect to the adjustment axis between an unlocking position and a locking position, wherein when the at least one locking element is in the unlocking position, the two fitting parts are pivotable relative to each other, and when the at least one locking element is in the locking position, the two fitting parts are non-rotatably locked to each other;
a bush element disposed in the bearing space;
at least one adjuster part pivotally mounted to the bush element and configured to adjust the at least one locking element between the unlocking position and the locking position; and
a cover element disposed on the bush element and configured to seal the bearing space, wherein the cover element is axially fixed with respect to the adjustment axis and rests against the at least one adjuster part; and
at least one sealing element disposed on at least one of the bush element and the cover element, and wherein the at least one sealing element rests against a bearing portion of the cover element and against a bearing surface of a fitting part.

19. A method for assembly of a fitting arrangement for use in a vehicle seat, the method comprising:
providing a first fitting part, a second fitting part, at least one locking element, at least one adjuster part, and a bush assembly including a bush element and a cover element;
arranging the bush element in a through opening of the first fitting part;
arranging the at least one locking element on the first fitting part and the at least one adjuster part on the bush element such that via a rotation of the at least one adjuster part about an adjustment axis, defined by the bush element, the at least one locking element is radially adjustable between an unlocking position and a locking position;
attaching the cover element to the bush element along the adjustment axis so that the cover element presses onto a portion of the bush element and against the at least one adjuster part to axially fix the at least one adjuster part, wherein pressing the cover element includes plastically deforming at least one squeeze contour or a scraper rib formed on the cover element or the bush element; and
arranging the second fitting part on the first fitting part to form a bearing space between the first fitting part and the second fitting part, wherein the bearing space receives the at least one locking element and the at least one adjuster part.

20. A method for assembly of a fitting arrangement for use in a vehicle seat, the method comprising:
providing a first fitting part, a second fitting part, at least one locking element, at least one adjuster part, and a bush assembly including a bush element and a cover element;
arranging the bush element in a through opening of the first fitting part;
arranging the at least one locking element on the first fitting part and the at least one adjuster part on the bush element such that via a rotation of the at least one adjuster part about an adjustment axis, defined by the bush element, the at least one locking element is radially adjustable between an unlocking position and a locking position;
attaching the cover element to the bush element along the adjustment axis so that the cover element presses against the at least one adjuster part to axially fix the at least one adjuster part;
arranging the second fitting part on the first fitting part to form a bearing space between the first fitting part and the second fitting part, wherein the bearing space receives the at least one locking element and the at least one adjuster part; and
arranging a first sealing element between the first fitting part and the bush element and/or arranging a second sealing element between the cover element and the second fitting part.

* * * * *